United States Patent
Haukilahti

(10) Patent No.: US 7,224,791 B2
(45) Date of Patent: May 29, 2007

(54) MECHANISM FOR QUEUING CALLS

(75) Inventor: Ilkka Kalervo Haukilahti, Helsinki (FI)

(73) Assignee: Medianatum Oy, Helsinki (FI)

( * ) Notice: Subject to any disclaimer, the term of this patent is extended or adjusted under 35 U.S.C. 154(b) by 0 days.

(21) Appl. No.: 10/552,458

(22) PCT Filed: Mar. 31, 2004

(86) PCT No.: PCT/FI2004/000193

§ 371 (c)(1),
(2), (4) Date: Dec. 29, 2005

(87) PCT Pub. No.: WO2004/091184

PCT Pub. Date: Oct. 21, 2004

(65) Prior Publication Data

US 2006/0146987 A1   Jul. 6, 2006

(30) Foreign Application Priority Data

Apr. 9, 2003   (FI) ................................. 20030533

(51) Int. Cl.
*H04M 3/00* (2006.01)
*H04M 3/42* (2006.01)

(52) U.S. Cl. ........................ 379/266.01; 379/210.01; 379/265.11

(58) Field of Classification Search ........... 379/210.01, 379/265.02, 265.11, 265.12, 265.13, 266.01, 379/266.02
See application file for complete search history.

(56) References Cited

U.S. PATENT DOCUMENTS

| | | | |
|---|---|---|---|
| 5,185,782 A * | 2/1993 | Srinivasan ............. | 379/210.01 |
| 5,206,903 A | 4/1993 | Kohler et al. | |
| 5,311,574 A * | 5/1994 | Livanos .................. | 379/209.01 |
| 5,436,967 A * | 7/1995 | Hanson .................. | 379/210.01 |
| 5,506,898 A | 4/1996 | Costantini et al. | |
| 5,627,884 A * | 5/1997 | Williams et al. ......... | 379/88.16 |
| 5,822,400 A * | 10/1998 | Smith ...................... | 379/32.02 |
| 6,259,786 B1 | 7/2001 | Gisby | |
| 2003/0031309 A1 | 2/2003 | Rupe et al. | |
| 2003/0103621 A1 | 6/2003 | Brown et al. | |

FOREIGN PATENT DOCUMENTS

WO    WO 99/41895    8/1999

* cited by examiner

Primary Examiner—Bing Q. Bui
(74) Attorney, Agent, or Firm—Oliff & Berridge, PLC

(57) ABSTRACT

A call processing apparatus (SW) comprises a first queue (Q1) for temporary storage of an incoming call and several parallel second queue systems (Q21–Q23), each corresponding to a different recipient (R1–R3). A recipient selection logic (RS) selects an optimal recipient for the call and terminates it after it has propagated through the first queue. The recipient selection logic then selects a second queue system (Q21–Q23) that corresponds to the selected recipient (R3). Instead of a real call, a virtual call corresponding to the incoming call is placed in the selected second queue system. A callback function (CF) and a call connection (CC) function detect the virtual call's propagation through the second queue system, and establish a callback call to the client (C1), whereby an optimal recipient can be selected for the call and telecommunication resources are not consumed during waiting.

17 Claims, 2 Drawing Sheets

MECHANISM FOR QUEUING CALLS

BACKGROUND OF THE INVENTION

The invention relates to a mechanism for queuing calls. U.S. Pat. No. 6,259,786 to Doug Gisby discloses a call queuing system for a call centre. The call queuing system establishes virtual calls for callers. As used in the '786 patent, a virtual queue environment means a system in which callers may disconnect from the call centre without losing their place in a queue, and still be served in the order they originally held in queue. The call queuing system allows the callers to disconnect and await a later callback when the virtual call is routed to an agent. An agent is the person, such as an expert, who ultimately takes the call. Callers are connected to an Interactive Voice Response unit (IVR) and informed that they may disconnect and await the callback. An IVR may also be used when the callback is made, informing the caller of the nature of the new call, and that they are now being connected to an agent.

A problem associated with the '786 patent is that all agents, ie, the experts who ultimately answer the calls, are assumed omniscient. In other words, each agent must be able to process a call from any caller. In some applications this is an unreasonable requirement. If the call is routed to an agent who is not able to answer the caller's question, the caller has queued in vain.

BRIEF DESCRIPTION OF THE INVENTION

It is thus an object of the present invention to provide a method and an apparatus for implementing the method so as to alleviate the above disadvantages. The objects of the invention are achieved by a method and an arrangement which are characterized by what is stated in the independent claims. The preferred embodiments of the invention are disclosed in the dependent claims.

An aspect of the invention is a method of processing an incoming call. The method comprises the following steps:
receiving the incoming call from a client;
placing the incoming call in a first queue system;
after the incoming call has propagated through the first queue system, selecting an optimal recipient for the call request and terminating the incoming call;
selecting one of several parallel second queue systems such that the selected second queue system corresponds to the selected recipient;
placing in the selected second queue system a virtual call that corresponds to the incoming call;
after the virtual call has propagated through the selected second queue system, establishing a callback call to the client and connecting the selected recipient to the callback call.

Another aspect of the invention is an apparatus for implementing the above method. Yet another aspect of the invention is a computer program product whose execution causes a computerized telephony equipment to carry out the method.

As used herein, the term 'queue system' means a system that implements at least one queue. A queue system may have multiple queues, such as a queue for each of several different priorities.

An advantage of the invention is that it supports different recipients, such as experts in different fields. The invention is based on the idea of having several parallel second queue systems such that there is a dedicated second queue system for each recipient or recipient class. Each recipient class comprises one or more potential call recipients. For example, assume that the recipients are software consultants. There may be one recipient class to support word processing questions, another class supports object-oriented programming, and so on.

The concept of a virtual call per se is known from said U.S. Pat. No. 6,259,786. A benefit of the virtual call is that the client does not have to keep waiting in the queue. In other words, telecommunication resources are not reserved for the waiting time. According to the invention, a virtual call is placed in one of the several second queue systems that corresponds to an optimal recipient. In order to do so, there must be a recipient selection mechanism. For example, the recipient selection mechanism may be implemented as a human operator that verbally interviews the client. Alternatively, the selection mechanism may be implemented as an IVR system in which the client selects the optimal recipient by prompted dialling of numbers (eg "0"=human operator, "1"=word processing questions, "2"=spreadsheet questions, etc.). For the purposes of the present invention, the details of the selection mechanism are not relevant. Neither is it essential that the selected recipient is the absolutely best-qualified recipient but that he/she is the recipient that appears to be suitable, given the information on the client's nature of business and the recipients' expertise that is available to the selection mechanism.

In a method according to the invention, the client can use a single telephone number or other network address to reach any or the potential recipients. The actual recipient is determined on the basis of the client's nature of business. The client does not have to be kept in a physical queue, which would consume telecommunication resources (or increase the phone bill).

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
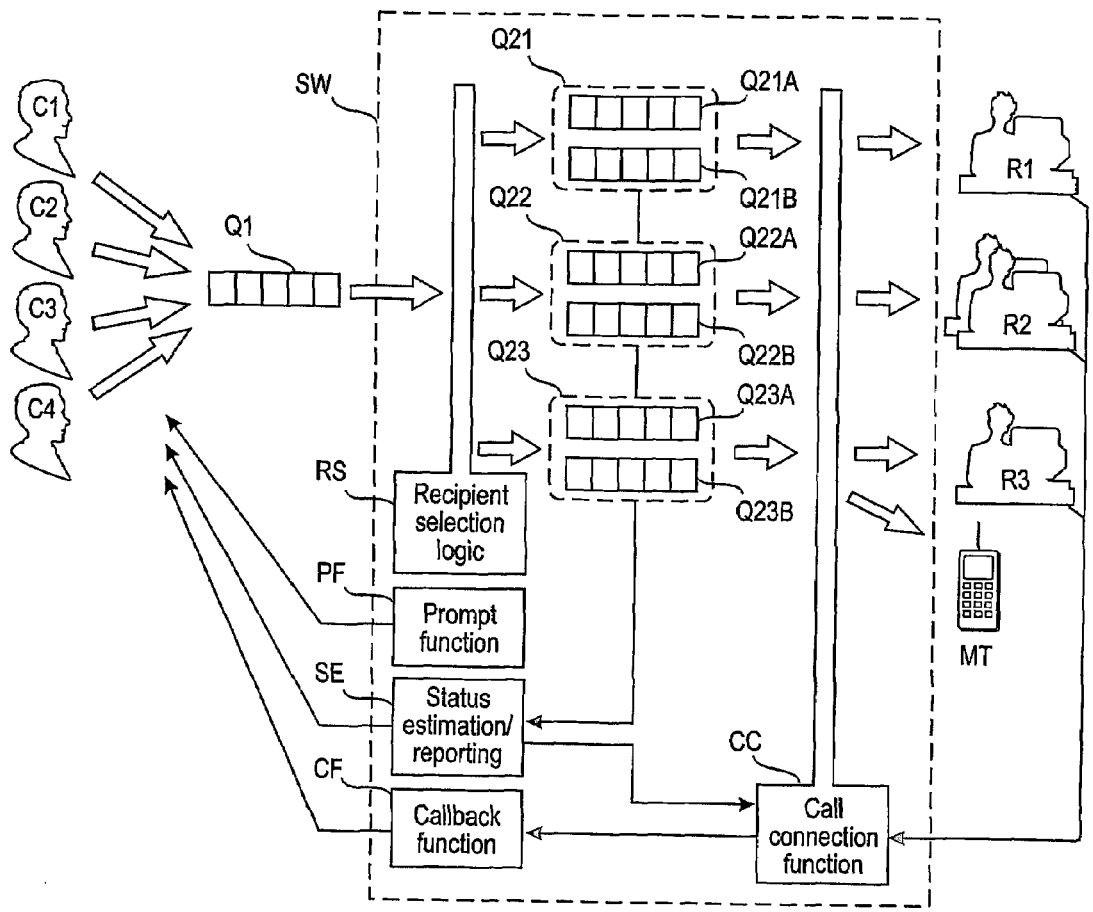
FIG. 1 is a block diagram illustrating the major elements of the invention.

FIG. 1 is a block diagram illustrating the major elements of the invention. Reference signs C1 to C4 denote four clients or callers. Reference sign Q1 denotes the first queue system in which the clients' calls are placed before propagating to a switch SW. In a typical embodiment the switch SW is a computer-controlled telephone switchboard. Reference signs R1 to R3 denote three recipients that ultimately process the clients' calls. Since FIG. 1 is mostly a logical block diagram, the reference signs C1 to C4 and R1 to R3 denote the clients and recipients both as terminals and as the persons using them. It is apparent from the context whether the discussion relates to the person or the terminal. The switch SW is controlled by a recipient selection logic RS. The recipient selection logic RS may be entirely human-operated, entirely computerized or a hybrid of the two. An example of a hybrid utilizes a prompt function PF, such as an interactive voice response (IVR) unit as follows. When a client calls the telephone number or other network address assigned to the switch SW, the incoming call is placed in the queue Q1 until the switch SW has available capacity to process the call. When the switch SW can process the incoming call, the prompt function PF sends the client's terminal an aural or visual prompt, depending on the terminal's type. For example, the contents of the prompt can be "dial '0' for a human operator, '1' for word processing questions, '2' for spreadsheet questions, '3' for programming languages", etc. If the client dials a non-zero number, the recipient selection logic RS may use a lookup table to automatically determine an optimal recipient for the client's call. In some applications or situations, the optimal recipient selection is more complicated and needs human intervention.

Either way, when a supposedly optimal recipient has been selected, the client's call is routed to the selected recipient if he/she is available. But frequently the selected recipient is busy and can remain busy for a long time. Accordingly, the prompt function PF may inform the client that he/she may terminate the call and he/she will be contacted by a callback call when the selected recipient is available. Instead of placing the client's actual call to a queue, a virtual call that identifies the client is placed in one of several second queue systems Q21 to Q23 that corresponds to the selected recipient. The term second queue system is used because there is a first queue system Q1 logically placed before the switch SW.

Each queue system comprises at least one queue but there may several queues in each queue system. By way of example, FIG. 1 shows two queues in each second queue system Q21 to Q23. For instance, Q21A and Q21B may be low- and high-priority queues, respectively, in the topmost second queue system Q21.

In addition to storing virtual calls the second queue systems may also store indications of real calls in which calls are actually kept waiting. The decision as to whether a virtual call or a real call should be kept waiting can be based on estimated waiting costs. In-house calls cause no charging and can be stored as real calls. Also, if the estimated waiting time is very short and/or the client calls from a low-cost telephone network, the call can be kept waiting as a real call. Virtual calls and real calls may be kept in separate queues.

There is preferably a status estimation and reporting function SE for estimating the waiting time based on the number and average duration of prior virtual calls in the second queue systems Q21 to Q23. The status estimate may be reported to the client as "There are four calls before your call. Your call can be processed in approximately xx minutes."

The status estimation and reporting function SE monitors the status of each queue, and when the client's call is at the rightmost end the queue, a call connection function CC establishes a call between the client and the selected recipient. Technically, the client is contacted by a callback call, which is initiated by the callback function CF, and the selected recipient is connected to the callback call. As to details of the call establishment, a reference is made to the U.S. Pat. No. 6,259,786 patent.

The recipients may or may not control call establishment to the clients. In a very simple embodiment, the recipients only have a conventional telephone which is alerted when the previous call has been processed and the current client has been reached by means of the callback call. Alternatively, the callback call to the client can be attempted only in response to the recipient's express indication that he/she is ready to take the call. As a yet further alternative, the recipient may have a personal computer that displays the pending virtual calls, and the recipient may take the calls in an order that is not strictly first-in-first-out (FIFO). Also, a recipient may direct calls to mobile terminals, one of which is denoted by reference sign MT.

It should be noted that FIG. 1 displays an embodiment of the invention, and there are several design alternatives. First, it is self-evident that the number of clients or recipients is purely exemplary. Also, the second queue systems Q21 to Q23 are shown inside the switch SW, but the queues can be implemented in the recipients' personal computers (shown in FIG. 2). However, implementing the second queue systems inside the switch SW facilitates operation with non-intelligent telephone equipment. Note that the second queue systems Q21 to Q23 do not store actual calls but virtual calls, which are essentially information on the identity of the original caller C1 to C4. In addition, the virtual calls preferably indicate the nature of business of the original caller, as will be shown in more detail later.

Some elements of FIG. 1 are essential to the invention, however. For example, it is an essential feature of the invention that there is a separate second queue system for each recipient or recipient group, wherein a recipient group consists of recipients that may take similar calls. By way of example, recipients R1 and R3 are shown as individual persons, while recipient R2 is shown as a group of two persons having substantially similar expertise. Another essential feature of the invention is the recipient selection logic RS which assigns a virtual call to the recipient that appears best-suited to process the clients call.

Figure 2:
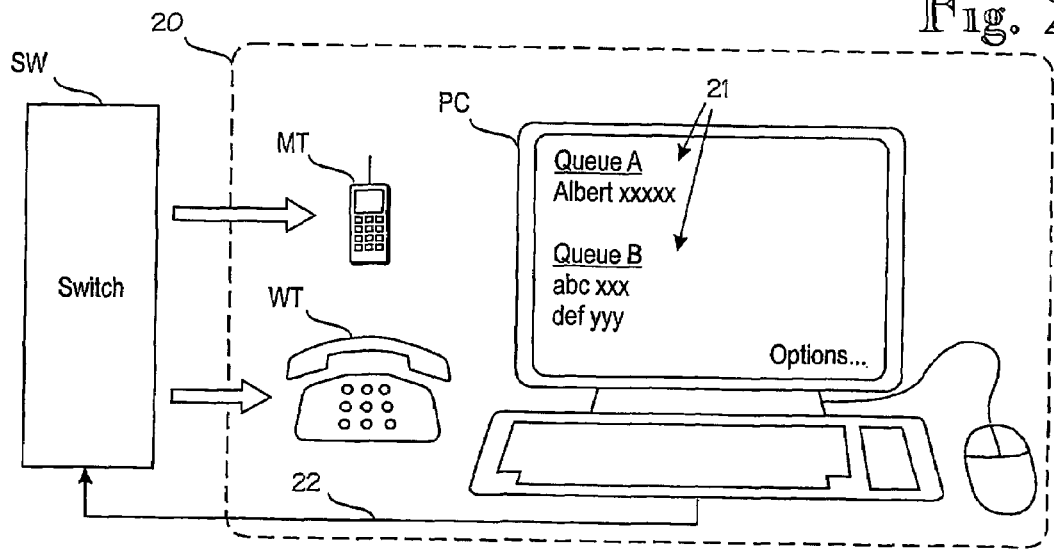
FIG. 2 illustrates an embodiment of a recipient station and its user interface.

FIG. 2 illustrates an embodiment of a recipient station 20 and its user interface. At a minimum, the recipient station 20 comprises a terminal or telephone, shown as a wired terminal WT and a mobile terminal MT. The recipient station 20 preferably comprises a personal computer PC with a keyboard and graphical user interface (display and pointing device, shown here as a mouse).

As generally denoted by arrows 21, the display of the computer PC may show the contents of the recipient's queue. In this example, the display shows data related to a high-priority queue A and a low-priority queue B. Under queue A, the display may show the caller's name and, optionally, topic of the call (shown as "xxxxx"). Similarly, two entries are shown under queue B.

A benefit of displaying the caller's identity and nature of business is twofold. First, the recipient can orientate him/herself to the incoming call and the caller. Second, according to a further preferred feature of the invention, the recipient can use the pointing device to pick entries of the queues in an order which is not strictly first-in-first-out. For example, the recipient may recognize a client that has apparently has a very short question and process this question before another one that takes much longer. Reference numeral 22 denotes such a recipient selection of pending virtual calls.

Under "options", the user interface preferably offers options to change the recipients available/busy status or presence. For instance, the recipient may direct calls to the mobile terminal MT instead of the wired terminal WT. Alternatively, he/she may decide whether calls are offered automatically as the previous call has been terminated or only in response to a specific action on the user interface.

Figure 3:
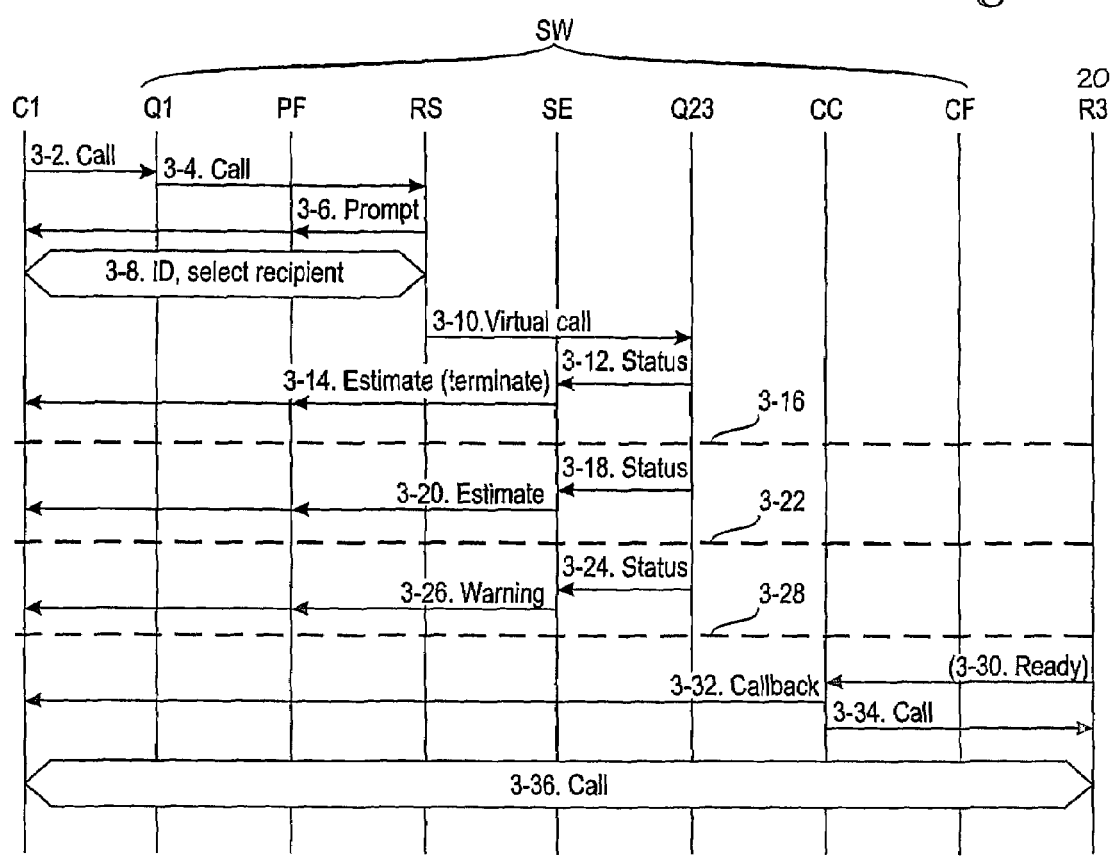
FIG. 3 is a signalling diagram illustrating the operation of the system substantially as shown in FIG. 1.

FIG. 3 is a signalling diagram illustrating the operation of the system substantially as shown in FIG. 1. In step 3–2, a client C1 makes an incoming call to the switch SW according to the invention. If the switch SW is busy (eg all operators are serving previous calls), the incoming call is placed in the first queue system Q1. Note that in FIG. 1 the first queue system Q1 was drawn outside the switch. Here the queue Q1 is drawn inside the switch SW to show that both implementations are possible. In step 3–4 the incoming call can be served, that is, the call propagates to the recipient selection logic RS. Note that steps 3–2 and 3–4 may be combined to a single step if the incoming call can be processed immediately. In step 3–6 the recipient selection logic RS reads or presents a prompt, via the prompt function PF, to the client C1. For instance, the client may be prompted to select a desired recipient by dialling a number. In step 3–8, the client registers to the switch. What is essential here is that the switch SW gets to know the client's identity and the selected recipient. The client's identity may be a telephone number or other network address, which may be known on the basis of a calling line indication (CLI). In a data call, the client may log in by means of a user id/password combination. The client's selected recipient may be known by touch dialling, voice recognition, human intervention or by any of a number of available techniques.

In step 3–10, a virtual call corresponding to the client C1 is placed in the selected recipient's second queue system. Assume that the selected recipient is R3 and the corresponding queue system is Q23. In step 3–12, the status estimation/reporting logic SE learns the status of Q23, including the number of prior entries in the queue. The status estimation logic SE also knows the estimated duration of calls. The estimated call duration may maintained per recipient, or it may be a value that is common to all recipients. In step 3–14, the estimated waiting time for client C1 is calculated based on the number of prior entries and the estimated call duration. The estimated waiting time is reported to the client C1. At the end of this step, the incoming call from the client Cl may be terminated. Alternatively, if the estimated waiting cost is sufficiently low, the client may be offered an opportunity to queue as a normal (non-virtual) call. The decision may be made by the client or a software agent in the switch SW. According to a further preferred feature, normal calls may be queued in a high-priority queue, while virtual calls are queued in a low-priority queue.

Horizontal dashed lines 3–16, 3–22 and 3–28 denote lengthy, unspecific passages of time. Steps 3–18 and 3–20 relate to a preferred feature of the invention. In step 3–18, the client's virtual call has been waiting in the second queue system Q23 while something happens which causes the status estimation logic SE to recalculate the estimated waiting time for client C1. For instance, another client may decide to withdraw a prior virtual call, or another call may be taking far longer than expected. If the new waiting time estimate deviates from the previously-reported estimate, the new estimate is reported to the client in step 3–20. Depending on the type of the client's terminal, the estimate may be sent as synthesized voice, a short message or other data message.

Steps 3–24 and 3–26 relate to a further preferred feature of the invention. In step 3–24 the status estimation logic SE learns from the queue Q23 that the client's estimated waiting time is some predetermined number of minutes, such as five minutes. In step 3–26, the client C1 is given a warning. The purpose of the warning is to prepare the client to the callback call in a few minutes. The client may interrupt his/her current activities and orientate him/herself to the discussion with the selected recipient (the callback call originates from the direction of the original recipient).

In step 3–30, the call connection function CC learns that the client's selected recipient R3 is ready to talk to the client C1. The legend of this step is placed in parenthesis because there are many ways to implement this step, and an explicit readiness indication from the recipient may not be necessary. For example, the call connection function CC may simply detect that the recipient has terminated the last call before the client's virtual call. Alternatively, the recipient may use his computer PC or one of the terminals MT, WT, to indicate that he/she is ready to take the next call. What is essential here is that call connection function CC somehow knows that the recipient is ready to talk to the client C1. In step 3–32, the call connection function CC places a callback call to the client C1. In step 3–34 the call connection function CC places a call to the recipient R3. In step 3–36, the calls to the client C1 and recipient R3 are connected, there is a call between the client C1 and recipient R3. Note that the call-establishing steps 3–32 and 3–34 are shown as single acts, while a skilled reader will realize that call establishment typically requires several acts, all of which, per se, are routine to the skilled reader.

The above scenario can be modified in various ways. For instance, if the primary recipient is unable to take calls for a long time, because of, say, a meeting, the switch SW may propose a call request service. If the client agrees to leave a call request, the switch SW may provide an estimate of the response time. After providing the estimated response time, the switch may inquire if the client still wishes to leave the call request or have the call transferred to an alternative recipient. If the client selects a call transfer to this recipient, the switch may again provide an estimated response time for this recipient, and the client can again choose between transferring a call request to this recipient and selecting yet another recipient. This loop can be repeated until the client accepts the proposed recipient. Thus the client does not have to place separate calls to multiple recipients, but he/she can remain in the queue of a recipient whose estimated response time is acceptable.

It will be apparent to a person skilled in the art that, as the technology advances, the inventive concept can be implemented in various ways. The invention and its embodiments are not limited to the examples described above but may vary within the scope of the claims.

The invention claimed is:

1. A method of processing an incoming call, the method comprising:

receiving the incoming call from a client;

placing the incoming call in a first queue system;

after the incoming call has propagated through the first queue system, selecting an optimal recipient for the incoming call and terminating the incoming call if the selected optimal recipient is not available;

if the selected optimal recipient is not available, selecting one of several parallel second queue systems such that the selected second queue system corresponds to the selected optimal recipient;

placing in the selected second queue system a virtual call that corresponds to the incoming call;

after the virtual call has propagated through the selected second queue system, establishing a callback call to the client and connecting the selected optimal recipient to the callback call.

2. The method according to claim 1, further comprising estimating the propagation time of the virtual call in the selected second queue system and reporting the estimated propagation time to the client.

3. The method according to claim 2, further comprising periodically repeating the estimating step and repeating the reporting subject to fulfillment of some predetermined re-reporting criteria.

4. The method according to claim 1, further comprising sending the client a warning predetermined time before the callback call.

5. The method according to claim 1, further comprising:
presenting to the selected recipient several virtual calls in the selected second queue system, each virtual call corresponding a specific client;
receiving an indication of a selected virtual call from the selected recipient; and
establishing a callback call to the client that corresponds to the selected virtual call.

6. The method according to claim 1, further comprising maintaining information on expertise of multiple recipients; and after the incoming call has propagated through the first queue system, determining a nature of business of the incoming call, selecting the optimal recipient for the incoming call based on the determined nature of business of the incoming call and the information on expertise of the multiple recipients.

7. An apparatus for processing an incoming call, the apparatus comprising:
call reception means for receiving the incoming call from a client;
a first queue system for temporary storage of the incoming call;
several parallel second queue systems;
a recipient selection logic operable to:
select an optimal recipient for the incoming call and for terminating the incoming call, after the incoming call has propagated through the first queue system if the selected optimal recipient is not available;
if the selected optimal recipient is not available, select one of the several parallel second queue systems such that the selected second queue system corresponds to the selected optimal recipient;
place in the selected second queue system a virtual call that corresponds to the incoming call;
means, responsive to the virtual call's propagation through the selected second queue system, operable to establish a callback call to the client and to connect the selected optimal recipient to the callback call.

8. The apparatus according to claim 7, further comprising a status estimation and reporting logic for estimating the propagation time of the virtual call in the selected second queue system and for reporting the same to the client.

9. The apparatus according to claim 7, further comprising a prompt function for instructing the client.

10. The apparatus according to claim 7, further comprising means for maintaining information on expertise of multiple recipients.

11. The apparatus according to claim 10, wherein the recipient selection logic also is operable to determine a nature of business of the incoming call and select the optimal recipient for the incoming call based on the determined nature of business.

12. A method of processing an incoming call, the method comprising:
maintaining information on expertise of multiple recipients;
receiving the incoming call from a client;
placing the incoming call in a first queue system;
after the incoming call has propagated through the first queue system, determining a nature of business of the incoming call, selecting an optimal recipient for the incoming call based on the determined nature of business of the incoming call and the information on expertise of multiple recipients, and terminating the incoming call if the selected optimal recipient is not available;
if the selected optimal recipient is not available, selecting one of several parallel second queue systems such that the selected second queue system corresponds to the selected optimal recipient;
placing in the selected second queue system a virtual call that corresponds to the incoming call;
after the virtual call has propagated through the selected second queue system, establishing a callback call to the client and connecting the selected optimal recipient to the callback call.

13. The method according to claim 12, further comprising estimating the propagation time of the virtual call in the selected second queue system and reporting the estimated propagation time to the client.

14. The method according to claim 13, further comprising periodically repeating the estimating step and repeating the reporting subject to fulfillment of some predetermined re-reporting criteria.

15. The method according to claim 12, further comprising sending the client a warning a predetermined time before the callback call.

16. The method according to claim 12, further comprising:
presenting to the selected optimal recipient several virtual calls in the selected second queue system, each virtual call corresponding to a specific client;
receiving an indication of a selected virtual call from the selected optimal recipient; and
establishing a callback call to the client that corresponds to the selected virtual call.

17. An apparatus for processing an incoming call, the apparatus comprising:
means for maintaining information on expertise of multiple recipients;
call reception means for receiving the incoming call from a client;
a first queue system for temporary storage of the incoming call;
several parallel second queue systems;
a recipient selection logic operable to:
determine a nature of business of the incoming call;
select an optimal recipient for the incoming call based on the determined nature of business and for terminating the incoming call, after the incoming call has propagated through the first queue system if the selected optimal recipient is not available;
if the selected optimal recipient is not available, select one of the several parallel second queue systems such that the selected second queue system corresponds to the selected optimal recipient;
place in the selected second queue system a virtual call that corresponds to the incoming call;
means, responsive to the virtual call's propagation through the selected second queue system, operable to establish a callback call to the client and to connect the selected optimal recipient to the callback call.

* * * * *